(12) United States Patent
Ishihara et al.

(10) Patent No.: US 12,730,779 B2
(45) Date of Patent: Sep. 8, 2026

(54) INFORMATION PROCESSING SYSTEM

(71) Applicant: TOYOTA JIDOSHA KABUSHIKI KAISHA, Toyota (JP)

(72) Inventors: Naoki Ishihara, Nisshin (JP); Naritomo Miura, Miyoshi (JP); Shinya Miyasaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/888,478

(22) Filed: Sep. 18, 2024

(65) Prior Publication Data

US 2025/0200011 A1 Jun. 19, 2025

(30) Foreign Application Priority Data

Dec. 19, 2023 (JP) ................................ 2023-213820

(51) Int. Cl.
*G06F 16/182* (2019.01)

(52) U.S. Cl.
CPC ................................. *G06F 16/182* (2019.01)

(58) Field of Classification Search
CPC ........ G06F 16/182; G06F 16/27; G06F 21/64; G06N 3/08; G06N 3/09; G06N 20/00
See application file for complete search history.

(56) References Cited

U.S. PATENT DOCUMENTS

2015/0339477 A1* 11/2015 Abrams .............. H04L 63/1416 726/23
2024/0311835 A1* 9/2024 Hirohata .................. H04L 9/50

FOREIGN PATENT DOCUMENTS

CN 117150520 A 12/2023
EP 4220450 A1 * 8/2023 ............ G06F 21/10
JP 2022-150778 A 10/2022
JP 2023-121093 A 8/2023

* cited by examiner

*Primary Examiner* — Philip C Lee
(74) *Attorney, Agent, or Firm* — SoraIP, Inc.

(57) ABSTRACT

The disclosure relates to an information processing system. The information processing system includes a distributed network that implements a distributed ledger. The distributed ledger stores one piece of transaction data regarding attribute information that indicates one classification related to one learned model out of a plurality of classifications regarding risks posed by AI.

2 Claims, 1 Drawing Sheet

411
41
42
40
NODE
NODE
412
4121
1
4122
44
43
NODE
NODE
11
10
30
TERMINAL
MANAGEMENT SERVER
121
12
20
DATABASE

INFORMATION PROCESSING SYSTEM

CROSS-REFERENCE TO RELATED APPLICATION

This application claims priority to Japanese Patent Application No. 2023-213820 filed on Dec. 19, 2023, incorporated herein by reference in its entirety.

BACKGROUND

1. Technical Field

The present disclosure relates to the technical field of information processing systems.

2. Description of Related Art

For example, a data management system has been proposed as an information processing system. This data management system includes a relearning data ledger synchronized using distributed ledger technology, and can verify afterwards whether a machine learning model is appropriate (see Japanese Unexamined Patent Application Publication No. 2022-150778 (JP 2022-150778 A)).

SUMMARY

The use of artificial intelligence (AI) including machine learning models is increasing. However, risks posed by the use of AI are often unknown.

The present disclosure was made in view of the above circumstances, and an object of the present disclosure is to propose an information processing system that can present information related to risks posed by AI.

An information processing system according to an aspect of the present disclosure includes a distributed network that implements a distributed ledger.

The distributed ledger stores one piece of transaction data regarding attribute information that indicates one classification related to one learned model out of a plurality of classifications regarding risks posed by AI.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figures 1, 2:
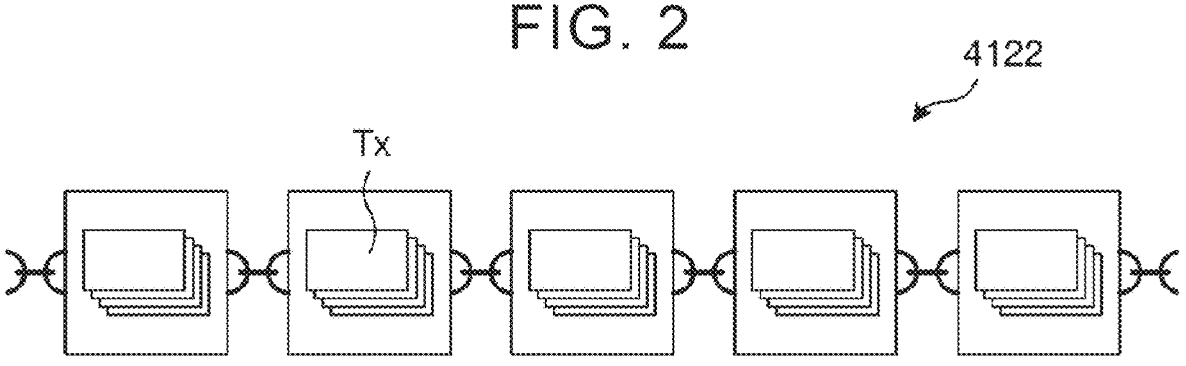
FIG. 1 is a block diagram illustrating a configuration of an information processing system according to an embodiment.
FIG. 2 is a conceptual diagram illustrating a concept of a distributed ledger.

An embodiment of an information processing system will be described with reference to FIGS. 1 and 2. FIG. 1 is a block diagram illustrating a configuration of an information processing system 1. FIG. 2 is a conceptual diagram illustrating a concept of the distributed ledger 4122.

In FIG. 1, the information processing system 1 includes a management server 10, a database 20, a terminal 30, and a distributed network 40. The distributed network 40 is a network for realizing a distributed ledger. In the present embodiment, a blockchain is exemplified as an example of a distributed ledger. The terminal 30 may be connected to the management server 10 via a wide area network such as the Internet.

The distributed network 40 has nodes 41, 42, 43, and 44. The number of nodes included in the distributed network 40 is not limited to “4”. The node 41 may include a processor 411 and a memory 412. The memory 412 may store a computer program 4121. The processor 411 may execute processing to be performed by the node 41 together with the memory 412 in which the computer program 4121 is stored (in other words, together with the memory 412 and the computer program 4121 stored in the memory 412). For example, the processor 411 may execute the computer program 4121 to implement logical functional blocks in the processor 411 for executing processing to be performed by the node 41.

The memory 412 of the node 41 may store a distributed ledger 4122 implemented by the distributed network 40 (in other words, constructed in the distributed network 40). As shown in FIG. 2, one or more transactional Tx may be stored in the distributed ledger 4122. Note that the configuration of the nodes 42, 43, and 44 may be the same as the configuration of the node 41.

The management server 10 may include a processor 11 and a memory 12. A computer program 121 may be stored in the memory 12. The processor 11 may execute processing to be performed by the management server 10 together with the memory 12 in which the computer program 121 is stored (in other words, together with the memory 12 and the computer program 121 stored in the memory 12). For example, by the processor 11 executing the computer program 121, logical functional blocks for executing processing to be performed by the management server 10 may be implemented in the processor 11.

The management server 10 may provide the terminal 30 with an application for browsing the distributed ledger realized by the distributed network 40 and an application for accessing the database 20. Therefore, the management server 10 may be referred to as an application server.

A learned model generated by machine learning may be registered in the database 20. For example, the learned model may be a learned model applicable to a navigation device. The learned model is not limited to a learned model applicable to at least one of the automated driving system and the navigation device. Note that the transaction related to the information indicating the learned model registered in the database 20 may be stored in the distributed ledger 4122 or a distributed ledger different from the distributed ledger 4122. The distributed ledger different from the distributed ledger 4122 may be realized by the distributed network 40 or may be realized by a distributed network different from the distributed network 40. Note that the learned model may not be registered in the database 20. In this case, the learned model may be registered in the distributed ledger.

An operation of the information processing system 1 in a case where one learned model is registered will be described. In the following, a case where registration of one learned model is performed via the terminal 30 will be described. The operator of the terminal 30 may instruct the management server 10 to register one learned model via the terminal 30 (for example, using an application provided by the management server 10). At this time, the operator may also instruct the management server 10 to register the attribute information indicating one classification related to one learned model among the plurality of classifications regarding the risk posed by AI.

The plurality of classifications related to the risk posed by AI may include, for example, at least one of "unacceptable risk", "high risk", "limited risk", and "minimal risk". An "unacceptable risk" may mean, for example, the degree of risk that poses a direct threat to a person. "High risk" may mean, for example, the degree of risk affecting a person. "Limited risk" may mean that there is no serious risk, but there is an obligation to specify that AI is working. "Minimum risk" may mean that there is little or no risk.

For example, the processor 11 of the management server 10 may register one learned model in the database 20 and generate a transaction regarding information indicating one learned model (for example, an identification number related to one learned model, a hash value related to one learned model, and the like). The processor 11 may further generate a transaction regarding attribute information indicating one classification related to one learned model. Note that the information indicating one learned model and the attribute information may be included in one transaction.

For example, the processor 411 of the node 41 included in the distributed network 40 may store the transaction related to the attribute information in the distributed ledger 4122 realized by the distributed network 40. Transactions relating to information indicating one learned model may be stored in the distributed ledger by one node (e.g., node 41) of the distributed network 40 or by one node of a distributed network different from the distributed network 40.

Next, an operation of the information processing system 1 in a case where one registered learned model is used will be described. Hereinafter, a case where one learned model is used via the terminal 30 will be described. The operator of the terminal 30 may transmit the use request information for requesting use of one learned model to the management server 10 via the terminal 30 (for example, using an application provided by the management server 10).

The processor 11 of the management server 10 that has received the use request information may read, from the distributed ledger 4122, attribute information indicating one classification related to one learned model. Thereafter, the processor 11 may transmit display information for displaying information for using one learned model to the terminal 30. The terminal 30 that has received the display information may display, for example, information for using one learned model on a screen related to the application.

Here, the information for using one learned model includes information on one classification related to one learned model. The information regarding one classification may include, for example, at least one of a name indicating the classification (for example, "unacceptable risk", "high risk", "limited risk" or "minimum risk"), and a number and a symbol indicating the classification. The information regarding one classification may include information indicating a usage mode of one learned model. The information indicating the usage mode of the one learned model may include, for example, at least one of "prohibition of use", "available under a predetermined condition", and "available without limitation". The information related to one classification may include a term of use of one learned model. Note that the content of the term of use may differ according to one classification (that is, a classification related to risks posed by AI). Note that, in a case where the term of use of one learned model is included in the information regarding one classification, the agreement to the term of use may be set as the use condition of one learned model. Note that a plurality of terms of use corresponding to a plurality of classifications may be stored in the terminal 30. In this case, the terminal 30 may select one term of use corresponding to the one classification from the plurality of terms of use based on the one classification related to the one learned model. Then, for example, the terminal 30 may display the selected term of use on the screen related to the application.

Technical Effect

In the information processing system 1, a transaction regarding attribute information indicating one classification related to one learned model is stored in the distributed ledger 4122. In other words, the distributed ledger 4122 stores classifications related to risks posed by AI for each learned model. Therefore, the information processing system 1 may be configured to display information related to risks posed by AI.

In the information processing system 1, when there is a request to use one learned model, information for using one learned model including information on one classification related to one learned model may be transmitted from the management server 10 to the terminal 30, for example. With this configuration, the operator of the terminal 30, for example, can be informed of the risks posed by AI prior to the actual use of one learned model.

In the information processing system 1, a distributed ledger 4122 that is extremely difficult to tamper with, and a classification related to risks posed by AI for each learned model are registered. Therefore, the information processing system 1 can display highly reliable information related to risks posed by AI. When a plurality of classifications regarding the risks posed by AI are revised or the like, the classification related to one learned model may be changed or added. In this case, the distributed ledger 4122 may store a transaction regarding attribute information indicating a classification related to one learned model before the change and a transaction regarding attribute information indicating a classification related to one learned model after the change. With this configuration, it is possible to track the change history of the classification related to one learned model.

Aspects of the disclosure derived from the above-described embodiments are described below.

An information processing system according to an aspect of the present disclosure includes a distributed network that implements a distributed ledger. The distributed ledger stores one piece of transaction data regarding attribute information that indicates one classification related to one learned model out of a plurality of classifications regarding risks posed by AI.

The information processing system may further include an output unit configured to, when a request to use the one learned model is received, output information regarding the one classification by reading the one piece of transaction data from the distributed ledger. The information on the one classification may be a term of use of the one learned model. In the above embodiment, the "management server 10" corresponds to an example of an "output unit."

The present disclosure is not limited to the above-described embodiments, and can be modified as appropriate within the scope and spirit of the disclosure that can be read from the claims and the entire specification. An information processing system with such a change is also included in the technical scope of the present disclosure.

What is claimed is:

1. An information processing system comprising:

a distributed network including processors and memories, each of the memories storing a distributed ledger, the distributed ledger storing a piece of transaction data including a classification, the classification including a use term corresponding to a risk posed by a learned model;

a server configured to output the piece of transaction data to a terminal in a case where the server receives a request to use the learned model; and the terminal including a display and configured to receive the piece of transaction data from the server, display the use term on the display, use the learned model corresponding to the use term in a case where an operator of the terminal agrees to the use term, and prohibit use of the learned model in a case where the operator does not agree to the use term, wherein the piece of transaction data includes a hash value related to the learned model, and the distributed ledger stores a piece of pre-revision transaction data and a piece of post-revision transaction data in a case where the server revises the classification.

2. The information processing system according to claim 1, wherein:

the classification includes a usage mode for the learned model; and the usage mode includes at least one of prohibition of use, availability under a condition, or availability without limitation.

* * * * *